Sept. 7, 1965        R. B. JOHNSON        3,204,377

MOLDING STRIPS

Filed April 12, 1963

INVENTOR.
ROBERT B. JOHNSON

BY Pauline Newman

ATTORNEY

United States Patent Office 3,204,377
Patented Sept. 7, 1965

3,204,377
MOLDING STRIPS
Robert B. Johnson, Peekskill, N.Y., assignor to Standard Coated Products Incorporated, Buchanan, N.Y., a corporation of New York
Filed Apr. 12, 1963, Ser. No. 272,705
3 Claims. (Cl. 52—127)

This invention relates to decorative and protective wall treatment, and is particularly concerned with an improved molding strip for use on walls covered with decorative and protective coated fabrics.

For many years, walls have been decorated and protected with wall coverings made of cloth, coated with a protective and decorative coating, and generally printed in designs like wallpaper. Such wall coverings are more useful than wallpaper in that they are not only washable but also protect the walls from developing plaster cracks.

In many places, these wall coverings have been used only on the upper part of walls, as where the bottom is tiled (as in many bathrooms, kitchens, hospital corridors, etc.) or paneled (as in many dining rooms). More recently, the formerly tiled and panel bottoms of many such two-part walls have also been covered with coated fabrics, generally somewhat sturdier than those used for general wall decoration, and designed to give maximum resistance to abrasion, scrubbing, and general wear. The natural parting line found with tile or wood is not present in such cases, since there is generally only a difference in thickness of the order of .01 inch or less between the two sorts of wall coverings, even if wallpaper is used as the top covering. Such a parting line may be provided with a conventional wood or plaster molding, applied before the wall coverings, but such moldings are expensive to install. In addition, they involve careful butting of the wall covering against the molding when the latter is applied, to avoid unseemly edges.

I have now discovered an improved, more versatile product, particularly applicable to wall surfaces characterized by irregularities or imperfections of construction or design, as well as to normally smooth surfaces, and having the further advantage of being dimensionally stable to the elastic stretch which, in practice, accompanies the use of foamed plastic moldings: since these foamed moldings stretch slightly during application to the wall, the elastic recovery which takes place with time tends to weaken the bond holding the molding against the wall, thus reducing its life, and also to form gaps at the abutting ends of the molding strips, thus impairing its appearance.

The improved molding of my invention is free of these difficulties, and is substantially more durable and long-lasting than prior products. I have now provided a new molding construction, which comprises two layers of foamed, deformable plastic, adhered to each other and to the wall surface by a pressure sensitive adhesive, the molding having flanged edges which provide firm external contact with the wall. Through the use of this plastic laminate, stretching during application to the wall is virtually eliminated. In addition, a tighter bond and more attractive appearance is obtained on application to irregular wall surfaces, due to the enhanced conformability obtained from this inner layer of deformable foamed plastic.

The invention can best be understood by reference to the accompanying drawing, in which—

Figure 1:
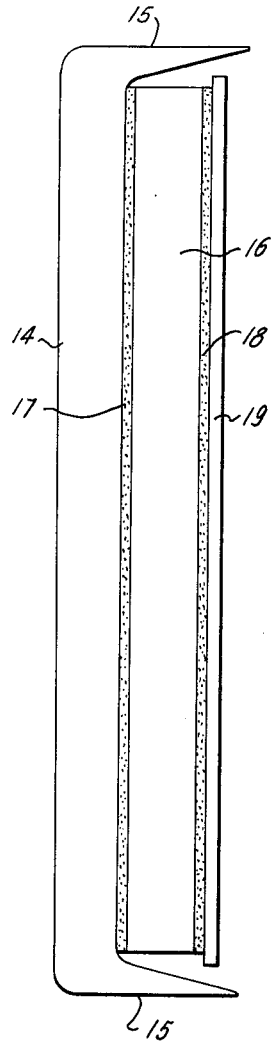
FIGURE 1 is a vertical elevation of the molding of the invention.
Figure 2:
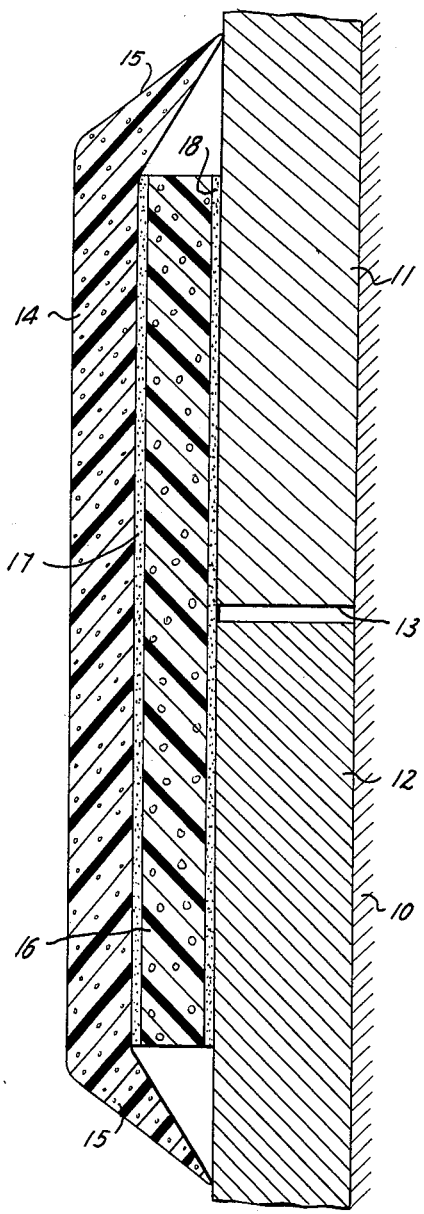
FIGURE 2 is a vertical section through a wall covered with protective covering with the joint between them covered by the molding strip in accordance with the invention.

As can be seen in FIGURE 2, a wall 10 may be decorated with an upper covering 11 of wallpaper or coated fabric such as is commonly used to decorate and protect walls. The bottom of the wall carries a covering 12 which is preferably of plastic coated fabric, designed to withstand the use and abuse to which wall bottoms are subjected, such as to the shock of furniture or cleaning devices being run into them. A seam 13 is formed, which may be uniform as shown, or which may vary somewhat if the pieces are of wall covering not all cut exactly even. This seam is covered by the molding of this invention, shown before use in FIGURE 1, and after application to the wall in FIGURE 2.

This molding comprises an outer member 14 which is an elongated strip of deformable foamed plastic composition, having flanged top and bottom edges 15, these flanges preferably forming about a 90° angle with the plane of the outer surface. The recess between the flanges, which comprise the inner surface of the plastic strip, carries on it an inner member 16, which is a resilient, conformable foamed plastic strip which carries on one side a coating of a normally tacky pressure-sensitive adhesive 17 by which it is adhered to the inner surface of the outer member, and on the other side a second coating of normally tacky pressure sensitive adhesive 18, for adhesion in use to the wall coverings 11 and 12. Said inner member 16 is in compressed adhesive contact with the outer member 14 between the flanges 15, which flanges enclose peripherally said inner member, but which flanges themselves are free of contact with the inner member and overhang and extend inwardly to a plane even with or slightly beyond the plane of said inner member. The adhesive layer 18 is covered before application to the wall, with a removable cover sheet 19, such as paper or cellophane, to maintain its normally tacky and pressure sensitive condition before use. The inner surface of the entire construction lies, as stated above, in a plane which does not protrude from a plane connecting the edges of the flanges 15 and the entire molding is thin enough adjacent the edges so that the edge portions are deformable; the balance of the molding may be of any cross section (e.g. the arc of a circle) but is preferably thin and uniform. When the molding is applied, the cover sheet 19 is stripped off and the molding is simply pressed to the wall surface. Adhesion is obtained at the pressure sensitive adhesive layer 18, and the foamed inner member 16 conforms to and provides firm contact even with irregular wall covering surfaces. The overhanging flanges 15 are deformed into sealing contact with the wall coverings 11 and 12 as the inner member 16 is adhered by pressure, due to the thinner, deformable nature of the edges of the molding.

The vinyl resin employed is a thermoplastic homopolymer or copolymer, such as polyvinyl chloride, copolymers of vinyl chloride with vinyl acetate or vinylidene chloride, polyvinylidene chloride, vinyl acetate-acrylic and other copolymers, and many others having properties suitable for use herein. They are compounded and plasticized so that the foams produced are readily deformable yet maintain sufficient rigidity to keep their shape and present an attractive surface. In a preferred embodiment of this invention, the outer member 14 is constructed of a more rigid, denser foamed material than the inner member 16, which is preferably more porous and flexible, for maximum conformability to minor irregularities in the wall surface to which it is adhered. In practice the inner member should be at least about $\frac{1}{16}$ inch thick, the thickness limited for reasons of economy, appearance and design.

The relative thickness of the contacted members 14 and 16, as compared with the extension of the flanges 15, is such that the plane joining the edges of the flanges lies beyond the inner surface of the inner member 16. The outer member 14 should be deformably thin in the regions of the flanges 15.

Hence, where the protective covering 19 is stripped off and the molding is pushed up against a wall, preferably at the seam between a top and bottom wall covering, the flanges 15 are deformed outwardly into a position such as shown in FIGURE 2. Since the strip is deformable, this results in the edges of the flanges 15 being deformed into planes of contact with the wall above and below the adhesive layer. These tight contact planes act to seal the strip, and retard the action of air and other destructive agencies on the adhesive, thereby markedly increasing the life of the molding.

The foamed plastic molding members 14 and 16 may be made by casting or extruding a plastisol composition comprising polyvinyl particles, a blowing agent, and a minor proportion of a suitable plasticizer which is preferably a liquid plasticizer, for reason of economy, but which may contain polymeric plasticizer as well. Other ingredients may also be compounded with the plastisol, such as coloring agents, stabilizers, fillers, flame retardants, and the like.

Heating of the mixture, and casting or extrusion, are coordinated to cause release of gas by the blowing agent during fusion of the resin, so as to form a cellular, flexible polyvinyl foamed product. A blowing agent is used which releases the gas at a temperature above the fusion point of the polyvinyl resin, since it is known that the procedure produces a closed cell structure having both strength and flexibility. The theory and practice of producing flexible foams of any desired density and foam structure are well known in the art.

The thin cross section shown in the drawings is preferred for its obvious economy of materials. The outer member 14 obviously need not be of the very thin cross section shown except at the region of the flanged edges 15. The main body of the molding could be of arcuate cross section, corrugated, or otherwise decorated.

In similar fashion, the resin composition of the members could be widely varied. Similarly, the strips can be used as moldings on plain plaster walls, and to hide the seams in plasterboard walls, if desired. These and other changes can be made in the specific embodiment of the invention illustrated, without departing from the scope of the invention, which is defined in the claims.

What is claimed is:

1. A plastic laminated molding strip for application to planar areas, comprising an outer member of deformable foamed plastic having a generally planar outer surface and an inner surface, and arcuate flanges at the longitudinal edges thereof, said flanges extending inwardly from the plane of said inner surface, thereby forming a recess between the flanges; an inner member of deformable foamed plastic disposed in said recess substantially to the inner edges of said flanges, said inner member being enclosed by said flanges and said recess being filled to less than its depth by said inner member, said member being adhered to the inner surface of the outer member by a pressure sensitive adhesive layer; a second layer of a normally tacky pressure sensitive adhesive disposed on the exposed surface of the inner member, said second adhesive layer being enclosed and substantially isolated by said flanges and covering the entire exposed surface of said inner member, said flanges being free of adhesive and overhanging and extending beyond the plane of said second adhesive layer; and a removable cover sheet disposed over said second adhesive layer in sealing engagement therewith, whereby said second adhesive layer is completely covered for maintaining its normally tacky and pressure sensitive condition before use of the article, said cover sheet being releasable from said second adhesive layer to expose the same for adhering said member to a surface by application of pressure thereto, whereby said overhanging flanges are deformed to provide firm contact with said surface.

2. A molding strip as in claim 1, wherein said foamed plastic is a vinyl plastic.

3. In combination with a wall structure covered with an upper covering of decorative sheet material, and a lower covering of decorative sheet material more wear resistant than the upper covering, the two coverings meeting in a seam line, an elongated plastic laminated molding covering said seam line comprising an outer member of deformable foamed plastic having a generally planar outer surface and an inner surface and arcuate flanges at the longitudinal edges thereof, said flanges extending inwardly from the plane of said inner surface, thereby forming a recess between the flanges; an inner member of deformable foamed plastic disposed in said recess substantially to the inner edges of said flanges, said inner member being enclosed by said flanges and adhered to the inner surface of the outer member by a pressure sensitive adhesive layer; a second layer of a normally tacky pressure sensitive adhesive disposed on the inner surface of the inner member, said second adhesive layer being enclosed and substantially isolated by said flanges and covering the entire inner surface of said inner member, said flanges being free of adhesive and overhanging and extending beyond the plane of said second adhesive layer, said molding adhered to the wall by said second adhesive layer whereby the flanges are deformed flush against the wall without intervening when the second adhesive layer is sealed against the wall.

References Cited by the Examiner

UNITED STATES PATENTS

| | | | |
|---|---|---|---|
| 2,057,873 | 10/36 | Atwood | 161—406 X |
| 2,831,049 | 4/58 | Cabral | 20—74 X |
| 3,105,323 | 10/63 | Esler | 20—74 X |

HARRISON R. MOSELEY, *Primary Examiner.*

REINALDO P. MACHADO, *Examiner.*